United States Patent
Wu et al.

(10) Patent No.: US 11,362,702 B2
(45) Date of Patent: Jun. 14, 2022

(54) ECHO AND NEAR-END CROSSTALK CANCELLATION SYSTEM

(71) Applicant: EcoNet (Suzhou) Limited, Suzhou (CN)

(72) Inventors: Chia-Lung Wu, Suzhou (CN); Dong-Ming Chuang, Suzhou (CN)

(73) Assignee: AIROHA TECHNOLOGY (SUZHOU) LIMITED, Suzhou (CN)

(*) Notice: Subject to any disclaimer, the term of this patent is extended or adjusted under 35 U.S.C. 154(b) by 353 days.

(21) Appl. No.: 16/427,411

(22) Filed: May 31, 2019

(65) Prior Publication Data
US 2020/0336171 A1    Oct. 22, 2020

(30) Foreign Application Priority Data

Apr. 17, 2019   (CN) .......................... 201910306239.4

(51) Int. Cl.
H04M 9/08      (2006.01)
H04B 3/23      (2006.01)
H04B 3/32      (2006.01)

(52) U.S. Cl.
CPC ............. *H04B 3/23* (2013.01); *H04B 3/32* (2013.01)

(58) Field of Classification Search
CPC ............ H04B 3/23; H04B 3/32; H04M 9/082
USPC ....................................... 379/406.08; 704/205
See application file for complete search history.

(56) References Cited

U.S. PATENT DOCUMENTS

2012/0136654 A1* 5/2012 Lou ....................... H04M 9/082
                                                                704/205

FOREIGN PATENT DOCUMENTS

| CN | 101339769 A | * | 1/2009 | ............ H04M 9/082 |
| CN | 101339769 A |   | 1/2009 | |
| CN | 101471694 A |   | 7/2009 | |
| CN | 102131014 A |   | 7/2011 | |
| CN | 104969537 A |   | 10/2015 | |

OTHER PUBLICATIONS

Office Action Report dated Sep. 24, 2021 in corresponding Chinese application.

* cited by examiner

*Primary Examiner* — Md S Elahee
(74) *Attorney, Agent, or Firm* — Bacon & Thomas, PLLC (57) ABSTRACT

An echo and near-end cross-talk (NEXT) cancellation system includes a time-domain processing module and a frequency-domain processing module. The time-domain processing module is configured to receive an unprocessed signal after an analog-to-digital conversion, remove at least one time-domain dominant component of interference from the unprocessed signal, and accordingly cancel a time-domain processed signal. The frequency-domain processing module is connected to the time-domain processing module, and configured to receive the time-domain processed signal, cancel at least one frequency-domain component of the interference from the unprocessed signal, and accordingly generate a processed signal.

10 Claims, 5 Drawing Sheets

ECHO AND NEAR-END CROSSTALK CANCELLATION SYSTEM

BACKGROUND OF THE INVENTION

1. Field of the Invention

The present invention relates to the technical field of Ethernet transceiver and, more particularly, to an echo and near-end crosstalk (NEXT) cancellation system.

2. Description of Related Art

Evolution of high-speed networks includes the increase in the speed of data transmission. There is one type of network known as Ethernet which realizes physical connection through twisted pairs, wherein Ethernet 1000 BASE-T or 10G BASE-T is the most common high-speed local area network (LAN) for connecting personal computers, workstations, and servers. Recently, Ethernet 2.5G BASE-T and Ethernet 5G BASE-T are also presented to the public.

Figure 1:
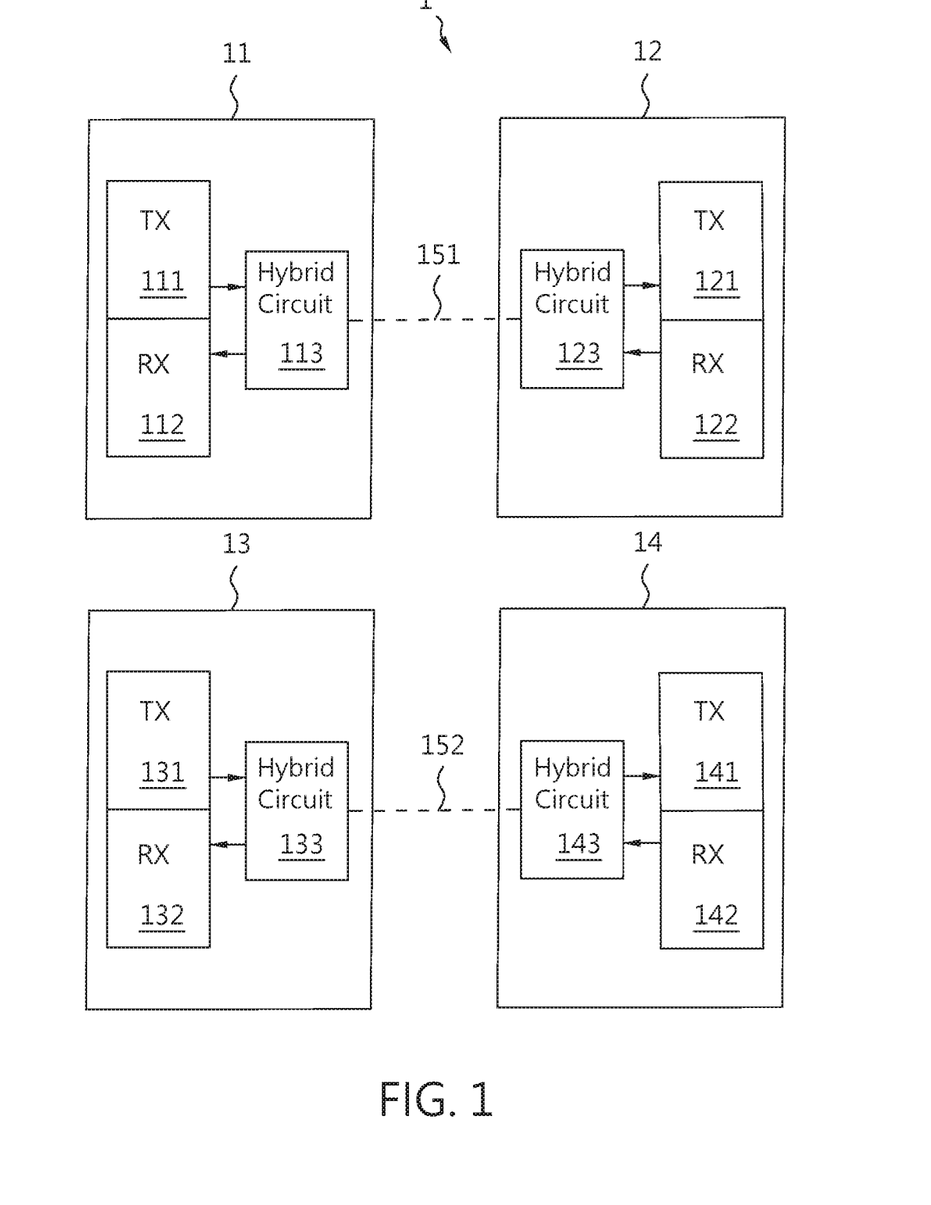
FIG. 1 illustrates an Ethernet transceiver system in the prior art.

FIG. 1 shows an Ethernet transceiver system 1.

As one example, an Ethernet transceiver system 1 includes a first transceiver 11, a second transceiver 12, a third transceiver 13, and a fourth transceiver 14, which perform communication in a bidirectional transmission channel.

The first transceiver 11 includes a first transmitter which receives a to-be-transmitted digital data, and processes and converts the to-be-transmitted digital data into a to-be-transmitted analog signal for being transmitted to the second transceiver 12 through the transmission channel. The first transceiver 11 further includes a second receiver 112 which receives a received analog signal from the second transceiver 12, and processes and converts the received analog signal into a received digital data. A hybrid circuit 113 is connected to a first common twisted pair 151. The hybrid circuit 113 of the first transceiver 11 is configured to have a suitable analog circuit, which is capable of separating a transmitting signal (i.e. the to-be-transmitted analog signal) from a receiving signal (i.e. the received analog signal) through the first common twisted pair 151.

Other transceivers 12, 13, and 14 also receive and transmit data in a manner as same as or similar to the first transceiver 11.

However, a transmitting signal of the first transmitter 111 of the first transceiver 11 may be coupled to a receiving signal of the first receiver 112 of the first transceiver 11. Such a coupling signal generated from mutually coupling a transmitting signal and a receiving signal of the same transceiver is known as echo signal and termed "ECHO" in the art.

Moreover, the third transceiver 13 and the fourth transceiver 14 also perform communication in the bidirectional transmission channel through a second common twisted pair 152. Because the first common twisted pair 151 is adjacent to the second common twisted pair 152, interference may occur between the two common twisted pairs. The interference includes near-end crosstalk (abbreviated as "NEXT") and far-end crosstalk (abbreviated as "FEXT"). The NEXT is the interference which occurs at the near end of the adjacent common twisted pair; for example, the first transmitter 111 of the first transceiver 11 interferes with a third receiver 132 of the third transceiver 13. The FEXT is the interference which occurs at the far end of the adjacent common twisted pair; for example, the first transmitter 111 of the first transceiver 11 interferes with a fourth receiver 142 of the fourth transceiver 14.

When performing full-duplex transmission on Ethernet 2.5G BASE-T or Ethernet 5G BASE-T, the channel response of TX ECHO and NEXT is relatively high (the number of taps being greater than 500). Therefore, it is an important technical subject to rapidly and effectively estimate a plurality of channel coefficients related to TX ECHO and NEXT.

SUMMARY OF THE INVENTION

The present invention includes a time-domain processing mechanism and a frequency-domain processing mechanism executed in sequence, and it can rapidly and optimally accomplish cancellation of TX ECHO and NEXT under a condition of low hardware complexity. In other words, the echo and near-end crosstalk (NEXT) cancellation system of the present invention transmits an unprocessed signal, which is derived from an analog-to-digital conversion, to a time-domain processing module to perform training and cancellation, and then pass the preliminary processed result to a frequency-domain processing module to perform the subsequent residue interference cancellation.

Specifically, the time-domain processing module is provided to process N A/D output values for each time, wherein N is the number of points (or sampling points) of the subsequent fast Fourier transform (FFT) performed by the time-domain processing module, and N may be 32, 64, 128, 256, 512, and so on.

First, in cooperation with the general channel estimation technique, such as a least square channel estimation, a cross-correlation-based channel estimation, and so on, N initial time-domain channel coefficients can be obtained by a time-domain ECHO and NEXT cancellation unit of the time-domain processing module.

Then, it is possible to cancel a most part of energy (or a plurality of time-domain dominant components) of the interference in the time-domain processing module by searching those taps with relatively large values, and suitably selecting K channel coefficients corresponding thereto, where K is a positive integer, and the value of K is proportional to the hardware complexity required by the time-domain ECHO and NEXT cancellation unit. When K is getting smaller, the hardware complexity required by the time-domain ECHO and NEXT cancellation unit is getting lower.

According to the present invention, for Ethernet 2.5G BASE-T or Ethernet 5G BASE-T, it is suitable to select K from 1 to 8.

Derived from the time-domain processing module, the residue interference is converted from a time-domain form into a frequency-domain form for acting as a plurality of initial values of a plurality of coefficients of a frequency-domain adaptive filter. The frequency-domain adaptive filter may be a least mean squares (LMS) filter.

The frequency-domain adaptive filter may be constituted by a frequency-domain adaptive filter updater and a frequency-domain ECHO and NEXT cancellation unit.

The frequency-domain adaptive filter updater continuously performs training, and updates a plurality of frequency-domain channel coefficients of the frequency-domain ECHO and NEXT cancellation unit. The frequency-domain channel coefficients of the frequency-domain ECHO and NEXT cancellation unit are used to calculate the residue interference, and remove it.

Because the time-domain processing module has cancelled the time-domain dominant components of the interference in advance, these time-domain dominant components of the interference will not enter the frequency-domain processing mechanism. Therefore, the frequency-domain channel coefficients required by the frequency-domain ECHO and NEXT cancellation unit can be converged rapidly. Meanwhile, it is possible to use smaller bit-width to accomplish the frequency-domain channel coefficients calculation and reduce the related computation (such as multiplication).

Accordingly, the hardware complexity of the frequency-domain ECHO and NEXT cancellation unit is also greatly reduced following the reduction of the bit-width of the frequency-domain channel coefficients. From this point of view, the present invention is able to surely reduce the hardware complexity the frequency-domain ECHO and NEXT cancellation unit.

Therefore, according to the apparatus relates to the aforementioned aspect of the present invention, there is provided an ECHO and NEXT cancellation system, which includes a time-domain processing module and a frequency-domain processing module. The time-domain processing module is configured to receive an unprocessed signal after an analog-to-digital conversion, cancel at least one time-domain dominant component of interference from the unprocessed signal, and generate a time-domain processed signal. The frequency-domain processing module is connected directly or indirectly to the time-domain processing module, and is configured to receive the time-domain processed signal, and generate a processed signal by cancelling at least one frequency-domain component of the interference from the time-domain processed signal.

The ECHO and NEXT cancellation system of the present invention further includes one end to receive the unprocessed signal, and another end to receive transmitting data, wherein the interference is coupled from the transmitting data.

The time-domain processing module further includes a time-domain channel estimation unit and a time-domain ECHO and NEXT cancellation unit. The time-domain channel estimation unit is configured to receive the unprocessed signal and the transmitting data and perform a channel estimation algorithm, so as to obtain (e.g. N) initial time-domain channel coefficients. The time-domain ECHO and NEXT cancellation unit is connected to time-domain channel estimation unit.

The time-domain ECHO and NEXT cancellation unit is configured to receive the transmitting data and the (e.g. N) time-domain channel coefficients, and calculate a plurality of time-domain dominant components of the transmitting data through K channel coefficients selected from the (e.g. N) time-domain channel coefficients.

K is selected from 1 to N, particularly an integer selected from 1 to 8.

The time-domain processing module further includes a first adder connected to the time-domain ECHO and NEXT cancellation unit for subtracting the time-domain dominant components from the unprocessed signal, so as to generate the time-domain processed signal.

The frequency-domain processing module further includes a first fast Fourier transformer, a second fast Fourier transformer, a frequency-domain adaptive filter updater, and a frequency-domain ECHO and NEXT cancellation unit. The first fast Fourier transformer is configured to receive the time-domain processed signal, and convert the time-domain processed signal into a frequency-domain unprocessed signal. The second fast Fourier transformer is configured to receive the transmitting data and convert the transmitting data into a frequency-domain transmitting data. The frequency-domain adaptive filter updater is connected to the first fast Fourier transformer and the second fast Fourier transformer and is configured to receive the frequency-domain unprocessed signal and the frequency-domain transmitting data, so as to train or update a plurality of frequency-domain channel coefficients. The frequency-domain ECHO and NEXT cancellation unit is connected to the frequency-domain adaptive filter updater.

The frequency-domain ECHO and NEXT cancellation unit is configured to receive the frequency-domain transmitting data and the frequency-domain channel coefficients, and calculate a plurality of frequency-domain residue components of the frequency-domain transmitting data through the frequency-domain channel coefficients.

The frequency-domain processing module further includes a second adder connected to the frequency-domain ECHO and NEXT cancellation unit for subtracting the frequency-domain residue components from the time-domain processed signal, so as to generate the processed signal.

The first fast Fourier transformer receives the time-domain processed signal through the second adder, or receives another time-domain signal outputted from another module and applicable to the frequency-domain adaptive filter updater.

In summary, in the present invention, the time-domain processing module is first used to cancel the time-domain dominant components ofthe interference, and subsequently the frequency-domain processing module only needs to calculate and cancel the residue interference, so as to reduce the calculation time, and thus reduce the hardware complexity of the entire system.

Other objects, advantages, and novel features of the invention will become more apparent from the following detailed description when taken in conjunction with the accompanying drawings.

DETAILED DESCRIPTION OF THE EMBODIMENT

Different embodiments of the present invention are provided in the following detailed description. These embodiments are not meant to be limiting. It is possible to make modifications, replacements, combinations, separations, or designs with the features of the present invention to apply to other embodiments.

It is worth noting that, hereinafter, terms such as "first", "second", and so on in the specification and claims are only intended to make clear distinction of elements with the same name. These terms do not mean these elements are located, used, permuted, or manufactured in any sequence.

Elements may be implemented in a suitable way, except for those specified ones. Each element may be a single circuit, or elements may form an integrated circuit integrated. A circuit may include one or more active elements, such as transistors, or logic gates, or one or more passive elements, such as resistors, capacitors, or inductors, but they are not meant to be limiting. Elements may be connected to each other in a suitable way, such as in series or in parallel by using one or more lines with respect to the input and output signal. Moreover, each element may allow input signals or output signals to be transmitted in turns or in parallel. The implementations mentioned above depend on practical applications.

Terms such as "system", "apparatus", "device", "module", "unit", and so on in the specification and claims refer to an electronic component, or a digital circuit, an analog circuit, or any other general circuit composed of electronic components. These terms do not imply any ranked or hierarchical relationship between them. Including a feature means including one or more such features, except for those specified ones.

EMBODIMENTS OF THE PRESENT INVENTION

Figure 2:
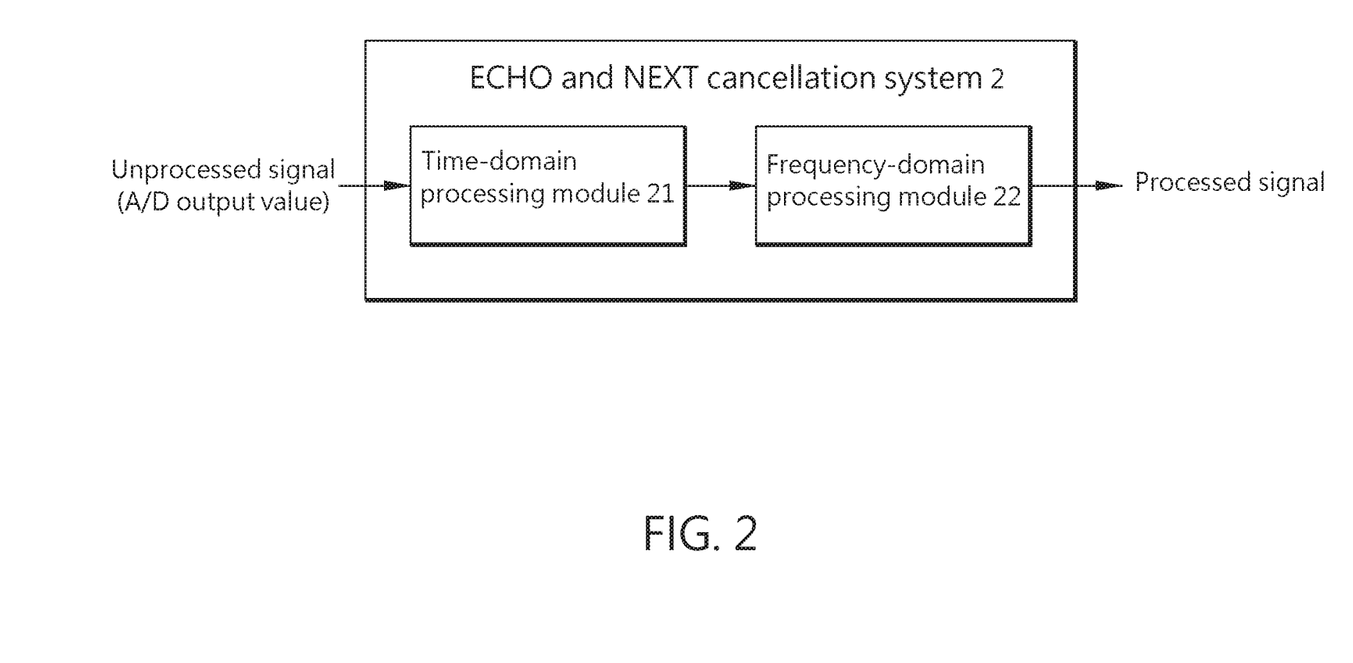
FIG. 2 is a block diagram showing an ECHO and NEXT cancellation system according to an embodiment of the present invention.

FIG. 2 is a block diagram showing an ECHO and NEXT cancellation system 2 according to an embodiment of the present invention.

The ECHO and NEXT cancellation system 2 of the present invention includes a time-domain processing module 21 and a frequency-domain processing module 22 connected sequentially. An unprocessed signal derived from an analog-to-digital conversion is first transmitted to the time-domain processing module 21 of the ECHO and NEXT cancellation system 2 to perform training and cancellation, and is then transmitted to the frequency-domain processing module 22 to perform the subsequent residue interference cancellation. Finally, the frequency-domain processing module 22 of the ECHO and NEXT cancellation system 2 outputs a processed signal.

Figure 3:
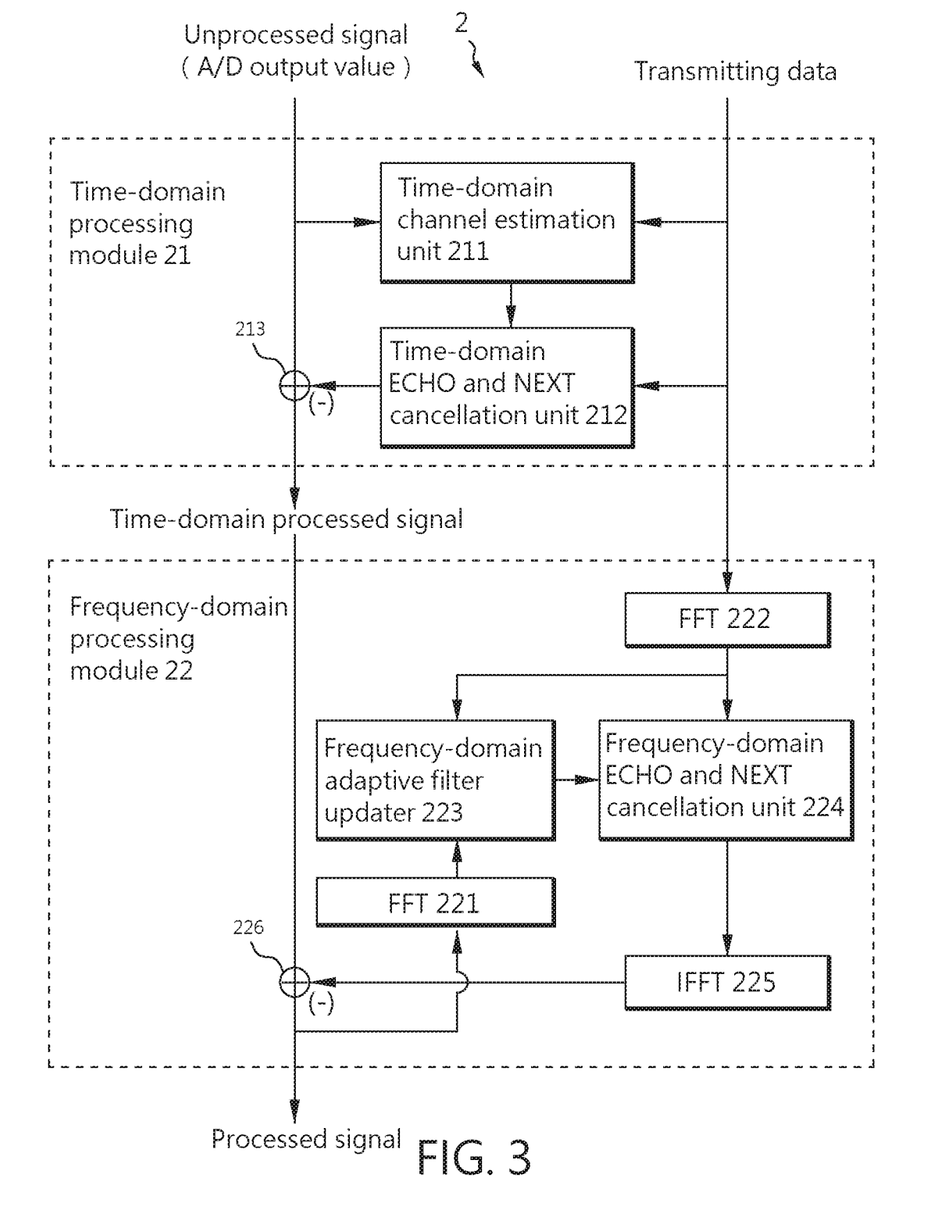
FIG. 3 illustrates a detailed structure of the ECHO and NEXT cancellation system of FIG. 2.

FIG. 3 illustrates a detailed structure of the ECHO and NEXT cancellation system of FIG. 2.

The ECHO and NEXT cancellation system 2 of the present invention has one end configured to receive the unprocessed signal, and another end configured to receive transmitting data. The transmitting data is such data to be transmitted by a transceiver in which the ECHO and NEXT cancellation system 2 is located, or by another transceiver adjacent to the ECHO and NEXT cancellation system 2. It can be understood that interference is caused by the transmitting data being coupled to the unprocessed signal, and thus the purpose of the ECHO and NEXT cancellation system 2 is to cancel the transmitting data from the unprocessed signal.

The time-domain processing module 21 is provided to process N unprocessed signals (i.e. A/D output value) for each time, wherein N is the number of points (or sampling points) of the subsequent fast Fourier transform (FFT) performed by the time-domain processing module, and N may be 32, 64, 128, 256, 256, and so on.

The time-domain processing module 21 includes a time-domain channel estimation unit 211, a time-domain ECHO and NEXT cancellation unit 212, and a first adder 213.

The time-domain channel estimation unit 211 receives the unprocessed signal and the transmitting data. The time-domain channel estimation unit 211 is configured to perform a least square channel estimation algorithm or a cross-correlation-based channel estimation algorithm, so as to obtain N initial time-domain channel coefficients. It is also possible to assign a set of specific constant values to be a plurality of initial values of the time-domain channel coefficients. The time-domain channel estimation unit 211 is connected to the time-domain ECHO and NEXT cancellation unit 212, and the time-domain ECHO and NEXT cancellation unit 212 is provided with these N time-domain channel coefficients. The time-domain channel estimation unit 211 can be activated for each group of N sampling points to update the time-domain channel coefficients, or can be activated for M groups of N sampling points (and thus involving N×M sampling points) to update the time-domain channel coefficients, or can be activated only for the first group of N sampling points to update the time-domain channel coefficients.

With reference to FIG. 3 again, instead of using all of N time-domain channel coefficients, it is possible to appropriately only select K time-domain channel coefficients from the N time-domain channel coefficients, wherein K is a positive integer, and the value of K is proportional to the hardware complexity required by the time-domain ECHO and NEXT cancellation unit 212. When K is getting smaller, the hardware complexity required by the time-domain ECHO and NEXT cancellation unit 212 is getting lower. In general, the K time-domain channel coefficients correspond to those echo channel taps with relatively large values. According to the present invention, for Ethernet 2.5G BASE-T or Ethernet 5G BASE-T, it is suitable to select K from 1 to 8.

The time-domain ECHO and NEXT cancellation unit 212 receives the transmitting data and the N time-domain channel coefficients, and calculates a plurality of time-domain dominant components of the transmitting data through the K channel coefficients selected from the N time-domain channel coefficients.

The first adder 213 is connected to the time-domain ECHO and NEXT cancellation unit 212 for subtracting the time-domain dominant components outputted from the time-domain ECHO and NEXT cancellation unit 212 from the unprocessed signal, so as to generate a time-domain processed signal. As shown in FIG. 3, an end labeled with minus sign (−) of the first adder 213 represents subtraction of a signal from the end.

The frequency-domain processing module 22 includes a first fast Fourier transformer (FFT) 221, a second fast Fourier transformer (FFT) 222, a frequency-domain adaptive filter updater 223, a frequency-domain ECHO and NEXT cancellation unit 224, an inverse fast Fourier transformer (IFFT) 225, and a second adder 226.

The first fast Fourier transformer 221 receives the time-domain processed signal through the second adder 226, and converts the time-domain processed signal into a frequency-domain unprocessed signal through the fast Fourier transform.

The second fast Fourier transformer 222 receives the transmitting data, and converts the transmitting data into frequency-domain transmitting data through the fast Fourier transform.

The frequency-domain adaptive filter updater 223 is connected to the first fast Fourier transformer 221 and the second fast Fourier transformer 222, so as to receive the frequency-domain unprocessed signal and the frequency-domain transmitting signal. The frequency-domain adaptive filter updater 223 is configured to continuously perform training according to the frequency-domain unprocessed signal and the frequency-domain transmitting signal, and update a plurality of frequency-domain channel coefficients required by the frequency-domain ECHO and NEXT cancellation unit 224. The frequency-domain adaptive filter updater 223 is connected to the frequency-domain ECHO and NEXT cancellation unit 224 for providing the frequency-domain channel coefficients to the frequency-domain ECHO and NEXT cancellation unit 224. Therefore, the combination of the frequency-domain adaptive filter updater 223 and the frequency-domain ECHO and NEXT cancellation unit 224 may be regarded as having a form of an adaptive filter, and the adaptive filter may be a least mean squares filter, for example.

Figure 4:
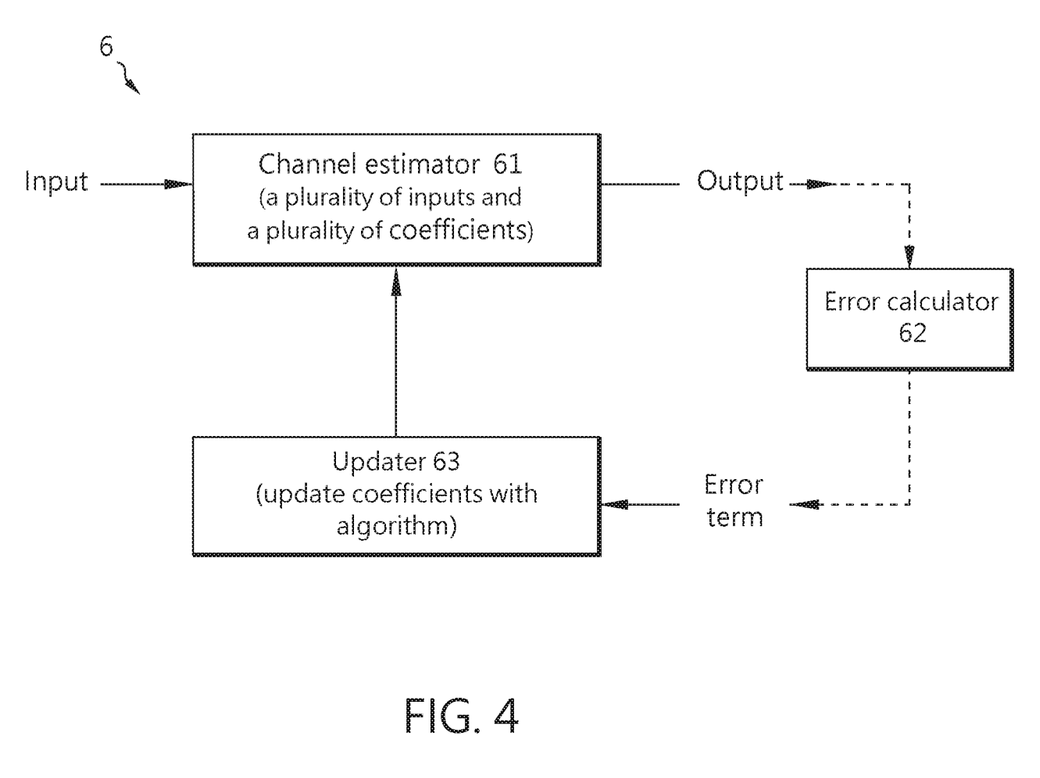
FIG. 4 illustrates a frequency-domain adaptive filter according to an embodiment of the present invention.

FIG. 4 illustrates the form of a frequency-domain adaptive filter 6 according to an embodiment of the present invention.

The frequency-domain adaptive filter 6 includes a channel estimator 61, an error calculator 62 and an updater 63. The channel estimator 61 may be a frequency-domain one-tap channel estimator, or more particular, a multi-tone one-tap channel estimator. The channel estimator 61 performs convolution on a plurality of inputs with a plurality of coefficients to generate a plurality of outputs. The channel estimator 61 is configured to perform multiplication for (N/2+1) times, because each of the inputs has been converted into a frequency-domain form. The error calculator 62 calculates a plurality of error terms from the outputs, and then provides the updater 63 with these error terms. According to the error terms, the error calculator 62 performs an adaptive algorithm, such as least mean square (LMS), normalized least mean square (NLMS), recursive least squares (RLS), and so on, to update the coefficients. While the frequency-domain adaptive filter 6 is exemplary, its specific design depends on practical applications, and may be modified and varied by those skilled in the art to meet the structure in FIG. 3 of the present invention. In particular, the respective components may be disassembled or combined to form the frequency-domain adaptive filter updater 223 and the frequency-domain ECHO and NEXT cancellation unit 224.

With reference to FIG. 3 again, the frequency-domain ECHO and NEXT cancellation unit 224 receives the frequency-domain transmitting data and the frequency-domain channel coefficients, and calculates a plurality of frequency-domain residue components of the frequency-domain transmitting data through the frequency-domain channel coefficients.

The inverse fast Fourier transformer 225 is connected to the frequency-domain ECHO and NEXT cancellation unit 224 to receive the frequency-domain components of the frequency-domain transmitting data, and converts the received frequency-domain components into a plurality of frequency-domain residue components through inverse fast Fourier transform.

The second adder 226 is connected to the frequency-domain ECHO and NEXT cancellation unit 224 for subtracting the time-domain residue components outputted from the frequency-domain ECHO and NEXT cancellation unit 224 from the time-domain processed signal, so as to generate the processed signal. As shown in FIG. 3, an end labeled with minus sign (−) of the second adder 266 represents subtraction of a signal from the end.

In this way, the interference is cancelled, and the frequency-domain processing module 22 of the ECHO and NEXT cancellation system 2 can output the processed signal.

Therefore, in the ECHO and NEXT cancellation system 2 of the present invention, the time-domain processing module 21 has cancelled the time-domain dominant components of the interference, and thus the time-domain dominant components of the interference will not enter the frequency-domain processing mechanism. Accordingly, the frequency-domain channel coefficients required by the frequency-domain ECHO and NEXT cancellation unit 224 of the frequency-domain processing module 22 can be converged rapidly. At the same time, it is possible to use a smaller bit-width to realize the frequency-domain channel coefficients, and thus reduce the related computation (such as multiplication).

Figure 5:
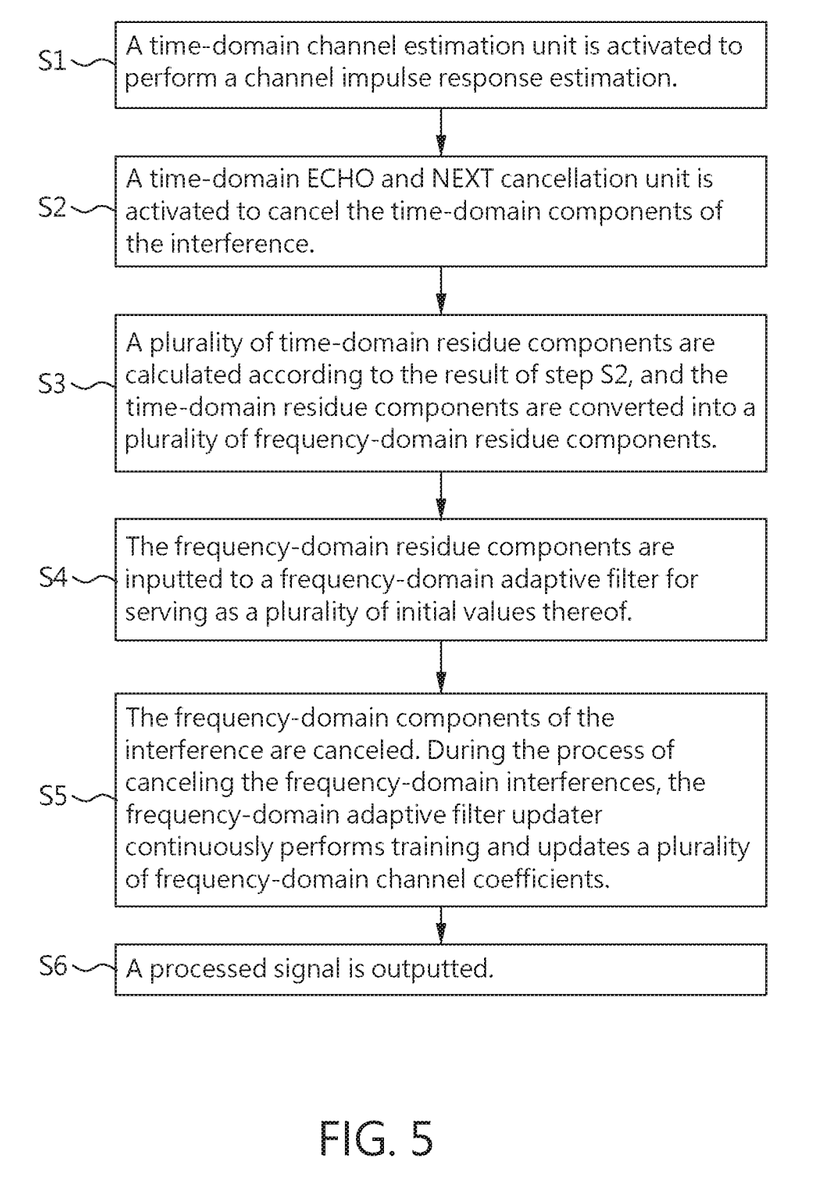
FIG. 5 is a flowchart showing an ECHO and NEXT cancellation method according to an embodiment of the present invention.

FIG. 5 is a flowchart showing an ECHO and NEXT cancellation method of the present invention.

The ECHO and NEXT cancellation method of the present invention includes the following steps:

In step S, a time-domain channel estimation unit 211 is activated to perform a channel impulse response estimation, such as a least square channel estimation algorithm or a cross-correlation-based channel estimation algorithm.

In step S2, a time-domain ECHO and NEXT cancellation unit is activated to cancel time-domain components of interference. Optionally or preferably, K time-domain dominant taps are cancelled. According to the present invention, for Ethernet 2.5G BASE-T or Ethernet 5G BASE-T, it is suitable to select K from 1 to 8.

In step S3, a plurality of time-domain residue components are calculated according to the result of step S2, and the time-domain residue components are converted into a plurality of frequency-domain residue components.

In step S4, the frequency-domain residue components are inputted to a frequency-domain adaptive filter for serving as a plurality of initial values of a plurality of coefficients of the frequency-domain adaptive filter.

Herein, the time-domain dominant taps will not appear in a frequency-domain processing mechanism since they have been removed in step S2, and thus it can simplify the convergence process for coefficient training of the frequency-domain adaptive filter. The adaptive filter may be a least mean squares filter, for example. The frequency-domain adaptive filter is formed by a frequency-domain adaptive filter updater and a frequency-domain ECHO and NEXT cancellation unit.

In step S5, a plurality of frequency-domain components of the interference are cancelled. During the process of cancelling the frequency-domain interference, the frequency-domain adaptive filter updater continuously performs training, and updates a plurality of frequency-domain channel coefficients of the frequency-domain ECHO and NEXT cancellation unit. As indicated above, the frequency-domain channel coefficients can converge rapidly since several dominant taps have been removed in time-domain mechanism in S2.

In step S6, a processed signal is outputted.

A simulation result performed on the C platform shows that the coefficient training periods of the ECHO and NEXT estimation and the frequency-domain adaptive filter are both reduced.

First Comparative Example

The interference cancellation system of the first comparative example is provided to cancel the interference completely by a frequency-domain mechanism. However, since the interfering time-domain dominant components are converted from a time-domain form to a frequency-domain form through the Fourier transform, the components in the frequency-domain form will occupy a wide range of the frequency-domain. In order to deal with the interfering frequency-domain components, it requires a significant amount of computations with high complexity, such as multiplications.

In comparison, in the embodiment of the present invention, a time-domain processing module is provided in series connection before using a frequency-domain processing module to cancel the interference. Therefore, for the frequency-domain processing module, it is able to accelerate the convergence of a plurality of frequency-domain channel coefficients, and reduce the complexity of the frequency-domain channel coefficients calculation.

Second Comparative Example

The interference cancellation system of the second comparative example first determines a plurality of channel coefficients of a channel between a first transceiver and a second transceiver, and then, based on the estimated channel coefficients, assigns the signal processing operation to a low-delay time-domain processing unit and a high-delay frequency-domain processing unit. The low-delay time-domain processing unit and the high-delay frequency-domain processing unit simultaneously perform signal processing in parallel.

In comparison, in the embodiment of the present invention, a time-domain processing module is provided in series connection before using a frequency-domain processing module to cancel. Therefore, the time-domain processing module and the frequency-domain processing module present a series connection to successively perform signal processing. Accordingly, the embodiment of the present invention does not need to depend on the estimated channel coefficients to assign the signal processing operation.

Third Comparative Example

The interference cancellation system of the second comparative example merely processes multiport interferences by a time-domain mechanism.

In comparison, the embodiment of the present invention not only involves a time-domain processing mechanism but also involves a frequency-domain processing mechanism and, through arranging the executing sequence of the two mechanisms, the computation time can be reduced, and the hardware complexity of the entire system can be decreased.

Although the present invention has been explained in relation to its embodiments, it is to be understood that many other possible modifications and variations can be made without departing from the spirit and scope of the invention as hereinafter claimed.

What is claimed is:

1. An echo and near-end crosstalk cancellation system, comprising:
   a time-domain processing module configured to receive an unprocessed signal after an analog-to-digital conversion, cancel at least one time-domain component of interference from the unprocessed signal, and generate a time-domain processed signal; and
   a frequency-domain processing module configured to receive the time-domain processed signal, cancel at least one frequency-domain component of the interference from the time-domain processed signal, and generate a processed signal;
   wherein the time-domain processing module further comprises a time-domain channel estimation unit and a time-domain echo and near-end crosstalk cancellation unit, wherein the time-domain channel estimation unit is configured to receive the unprocessed signal and a transmitting data, wherein the interference is coupled from the transmitting data,
   wherein the time-domain channel estimation unit acquires a plurality of time-domain channel coefficients according to the unprocessed signal and the transmitting data, and the time-domain echo and near-end crosstalk cancellation unit acquires the time-domain component of the interference according to the time-domain channel coefficients.

2. The echo and near-end crosstalk cancellation system as claimed in claim 1, further comprising one end for receiving the unprocessed signal, and another end for receiving the transmitting data.

3. The echo and near-end crosstalk cancellation system as claimed in claim 2, wherein:
   the time-domain channel estimation unit is configured to perform a channel estimation algorithm to obtain N initial time-domain channel coefficients; and
   the time-domain echo and near-end crosstalk cancellation unit is connected to the time-domain channel estimation unit.

4. The echo and near-end crosstalk cancellation system as claimed in claim 3, wherein the time-domain echo and near-end crosstalk cancellation unit is configured to receive the transmitting data and the time-domain channel coefficients, and calculate a plurality of time-domain dominant components of the transmitting data through K channel coefficients selected from the time-domain channel coefficients.

5. The echo and near-end crosstalk cancellation system as claimed in claim 4, wherein K is a positive integer selected from 1 to N, wherein N is a number of points or a number of samples used in a fast Fourier transform for frequency-domain processing.

6. The echo and near-end crosstalk cancellation system as claimed in claim 5, wherein the time-domain processing module further includes a first adder connected to the time-domain echo and near-end crosstalk cancellation unit for subtracting the time-domain dominant components from the unprocessed signal, so as to generate the time-domain processed signal.

7. The echo and near-end crosstalk cancellation system as claimed in claim 6, wherein the frequency-domain processing module further includes:
   a first fast Fourier transformer configured to receive the time-domain processed signal, and convert the time-domain processed signal into a frequency-domain unprocessed signal;
   a second fast Fourier transformer configured to receive the transmitting data, and convert the transmitting data into a frequency-domain transmitting data;
   a frequency-domain adaptive filter updater connected to the first fast Fourier transformer and the second fast Fourier transformer, and configured to receive the frequency-domain unprocessed signal and the frequency-domain transmitting data, so as to train or update a plurality of frequency-domain channel coefficients; and
   a frequency-domain echo and near-end crosstalk cancellation unit connected to the frequency-domain adaptive filter updater.

8. The echo and near-end crosstalk cancellation system as claimed in claim 7, wherein the frequency-domain echo and near-end crosstalk cancellation unit is configured to receive the frequency-domain transmitting data and the frequency-domain channel coefficients, and calculate a plurality of frequency-domain residue components of the frequency-domain transmitting data through the frequency-domain channel coefficients.

9. The echo and near-end crosstalk cancellation system as claimed in claim 8, wherein the frequency-domain processing module further includes a second adder connected to the frequency-domain echo and near-end crosstalk cancellation unit for subtracting the frequency-domain residue components from the time-domain processed signal, so as to generate the processed signal.

10. The echo and near-end crosstalk cancellation system as claimed in claim 9, wherein the first fast Fourier transformer receives the time-domain processed signal through the second adder, or receives another time-domain signal that is outputted from another module and adapted to the frequency-domain adaptive filter updater.

\* \* \* \* \*